(12) United States Patent
Chang (10) Patent No.: US 9,573,212 B2
(45) Date of Patent: Feb. 21, 2017

(54) GAP DETECTION APPARATUS

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 334 days.

(21) Appl. No.: 14/496,541

(22) Filed: Sep. 25, 2014

(65) Prior Publication Data

US 2015/0129423 A1   May 14, 2015

(30) Foreign Application Priority Data

Nov. 8, 2013  (CN) .......................... 2013 1 05476236

(51) Int. Cl.
  *B23H 3/02* (2006.01)
  *B23H 7/18* (2006.01)
  *B23H 7/32* (2006.01)

(52) U.S. Cl.
  CPC ......... *B23H 3/02* (2013.01); *B23H 7/18* (2013.01); *B23H 7/32* (2013.01); *B23H 2500/20* (2013.01)

(58) Field of Classification Search
  CPC ............... B23H 3/02; B23H 7/18; B23H 7/32; B23H 2500/20
  USPC ................................. 205/642, 649, 651, 654
  See application file for complete search history.

(56) References Cited

U.S. PATENT DOCUMENTS

| 5,444,205 A * | 8/1995 | Lodetti ................... B23H 7/06 |
| | | 219/69.12 |
| 2015/0083608 A1* | 3/2015 | Chang ..................... B23H 3/04 |
| | | 205/643 |

FOREIGN PATENT DOCUMENTS

| JP | 2001-341052 A | 12/2001 |
| TW | 201111079 A | 4/2011 |
| TW | 201114530 A | 5/2011 |

* cited by examiner

*Primary Examiner* — Nicholas A Smith
(74) *Attorney, Agent, or Firm* — Zhigang Ma (57) ABSTRACT

A gap detection apparatus for determining in real time the gap required for electrochemical machining gap includes a tooling electrode, a plurality of tool adjusting electrodes, a feedback circuit, a processing feed mechanism for controlling the tooling electrode, a three-dimensional driving mechanism, and an automatic control and measurement system. The tooling electrode includes a plurality of through-holes for receiving tool adjusting electrodes. The three-dimensional driving mechanism is mounted upon the processing feed mechanism, which includes a Z-coordinate feeding portion having a thimble for the feeding of the tool adjusting electrodes. The automatic control and measurement system controls the feed of the processing feed mechanism and the three-dimensional driving mechanism, and establishes the required gap for electrochemical machining.

15 Claims, 8 Drawing Sheets

GAP DETECTION APPARATUS

FIELD

The subject matter herein generally relates to electrochemical machining

BACKGROUND

Electrochemical machining (ECM) is a commonly used method of machining electrically conductive workpieces with one or more electrically conductive tooling electrodes. During machining, a tooling electrode is located near the workpiece, such that a gap is defined therebetween, that is the machining gap. The gap is filled with a pressurized, flowing, aqueous electrolyte, such as a sodium nitrate aqueous solution. For a given tooling electrode geometry, dimensional accuracy of the workpiece is primarily determined by the distribution of the gapping. The gap size should be maintained at a proper range. Too small a gap, such as less than 100 micrometers in a standard ECM operation, could lead to short-circuiting between the tooling electrode and the workpiece. Too large a gap could lead to excessive gap variation, as well as reduction in the machining rate. Monitoring and controlling the gap size between the tooling electrode and the workpiece is important for ECM.

Lack of suitable means for detecting gap size may hinder ECM accuracy control. Without such means, many rounds of costly trial-and-error experiments must be run to obtain the gap size changes that occur during the machining process. Gap size can change significantly during the machining process, partly because conductivity of the electrolyte may change in the gap due to heating or gas bubble generation on the tooling electrode surface. Variation and inaccuracy in tooling electrode feed rate and tooling electrode positioning can also contribute to changes in gap size and workpiece thickness. In-process gap detection is important for improving ECM process control.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure describes a gap detection apparatus for detecting an electrochemical machining gap.

Figure 1:
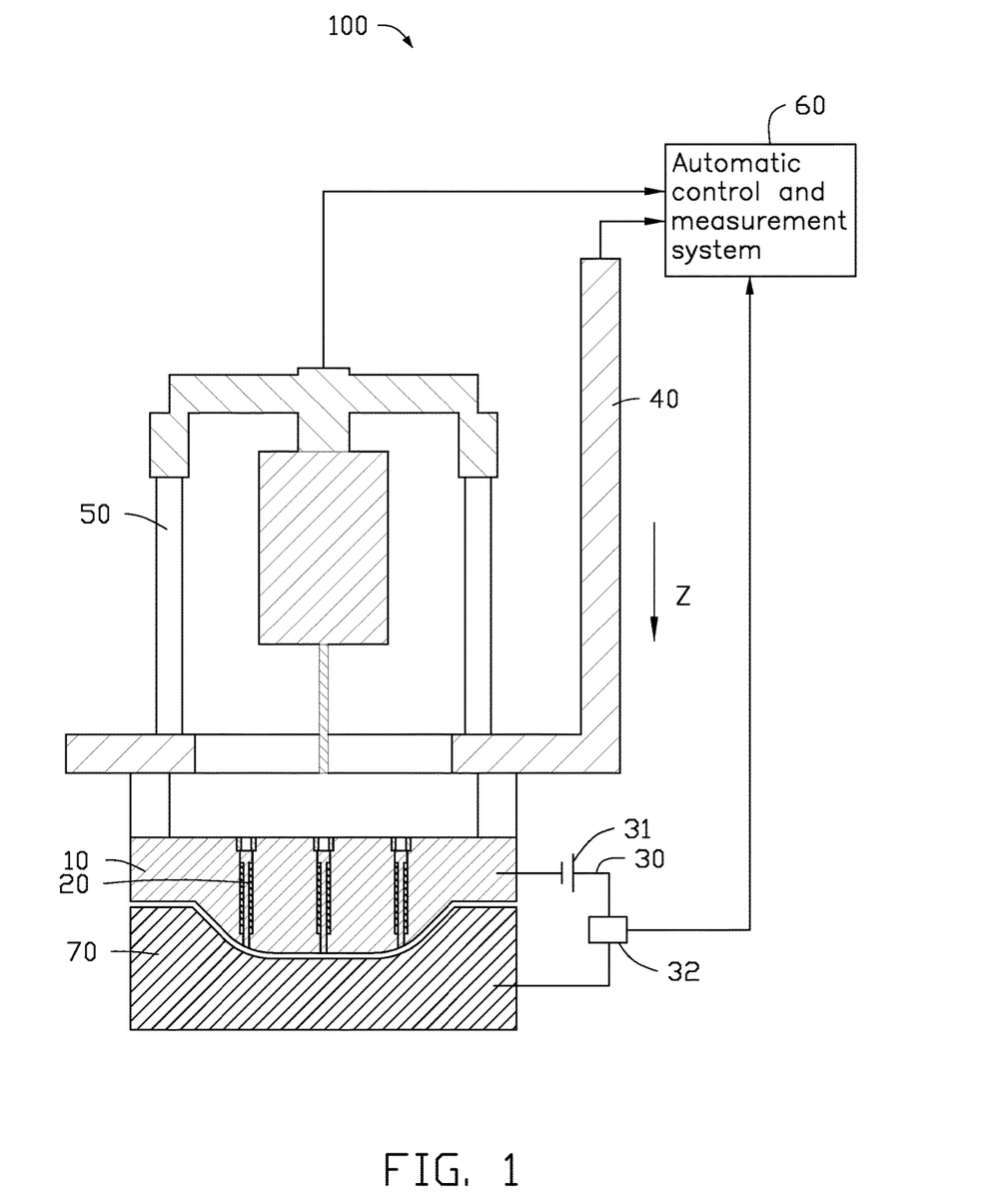
FIG. 1 is a cross-sectional view of an embodiment of a gap detection apparatus.

FIG. 1 illustrates an embodiment of a gap detection apparatus. The gap detection apparatus 100 can include a tooling electrode 10, a plurality of tool adjusting electrodes 20 positioned in the tooling electrode 10, a feedback circuit 30, a processing feed mechanism 40, a three-dimensional (3D) driving mechanism 50 mounted upon the processing feed mechanism 40, and an automatic control and measurement system 60. The tooling electrode 10 can be positioned on the processing feed mechanism 40. The automatic control and measurement system 60 can control the processing feed mechanism 40 and 3D driving mechanism 50.

The feedback circuit 30 can be connected with the processing electrode 10 and the workpiece 70, and can include a electrical power source 31 and a sampler 32. The short circuit voltage of the electrical power source 31 can be less than the decomposition voltage of electrochemical machining for the workpiece 70.

The automatic control and measurement system 60 can control the feed of the tooling electrode 10 for adjusting the electrochemical machining gap by controlling the processing feed mechanism 40. The automatic control and measurement system 60 can control moving the 3D driving mechanism 50, and control the feed and return of the 3D driving mechanism 50 by collecting the short-circuited signal of the feedback circuit 30. In addition, the automatic control and measurement system 60 can measure the distance of the feed of the 3D driving mechanism 50.

Figure 2:
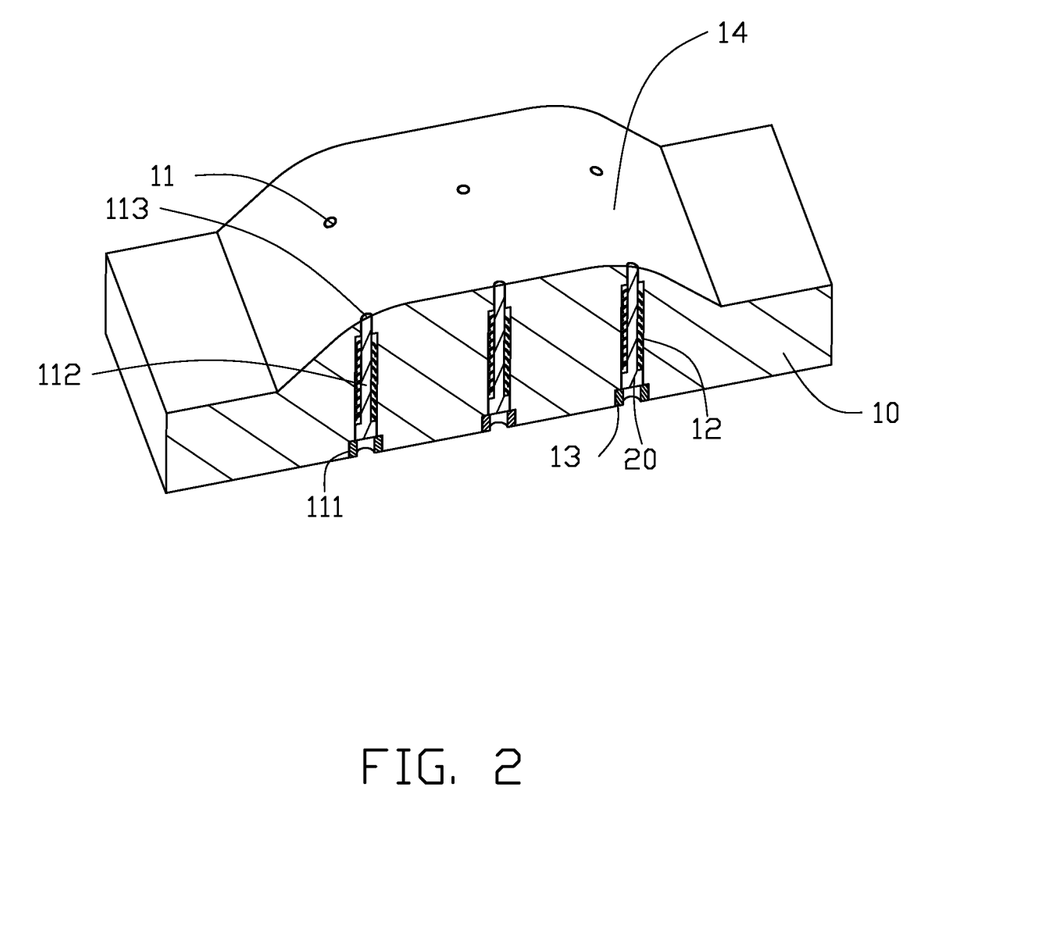
FIG. 2 is an isometric and cross-sectional view of a tooling electrode of the gap detection apparatus as shown in FIG. 1.

FIG. 2 illustrates that the tooling electrode 10 can include a plurality of through-holes 11, a plurality of springs 12, a plurality of clasping rings 13, and a processing portion 14. The through-holes 11 can be positioned in the tooling electrode 10 in an array. Each of the through-holes 11 can be a stepped hole, and can include a upper through-hole portion 111, a middle through-hole portion 112, and a lower through-hole portion 113. The diameter of the upper through-hole portion 111 can be larger than the diameter of the middle through-hole portion 112, and the diameter of the middle through-hole portion 112 can be larger than the diameter of the lower through-hole portion 113. The plurality of tool adjusting electrodes 20 can be respectively positioned in different portions of the through-holes 11.

Each of the springs 12 can be positioned in the middle through-hole portion 112 of each of the through-holes 11, and each of the clasping rings 13 can be positioned in the upper through-hole portion 111 of each of the through-holes 11.

Figure 3:
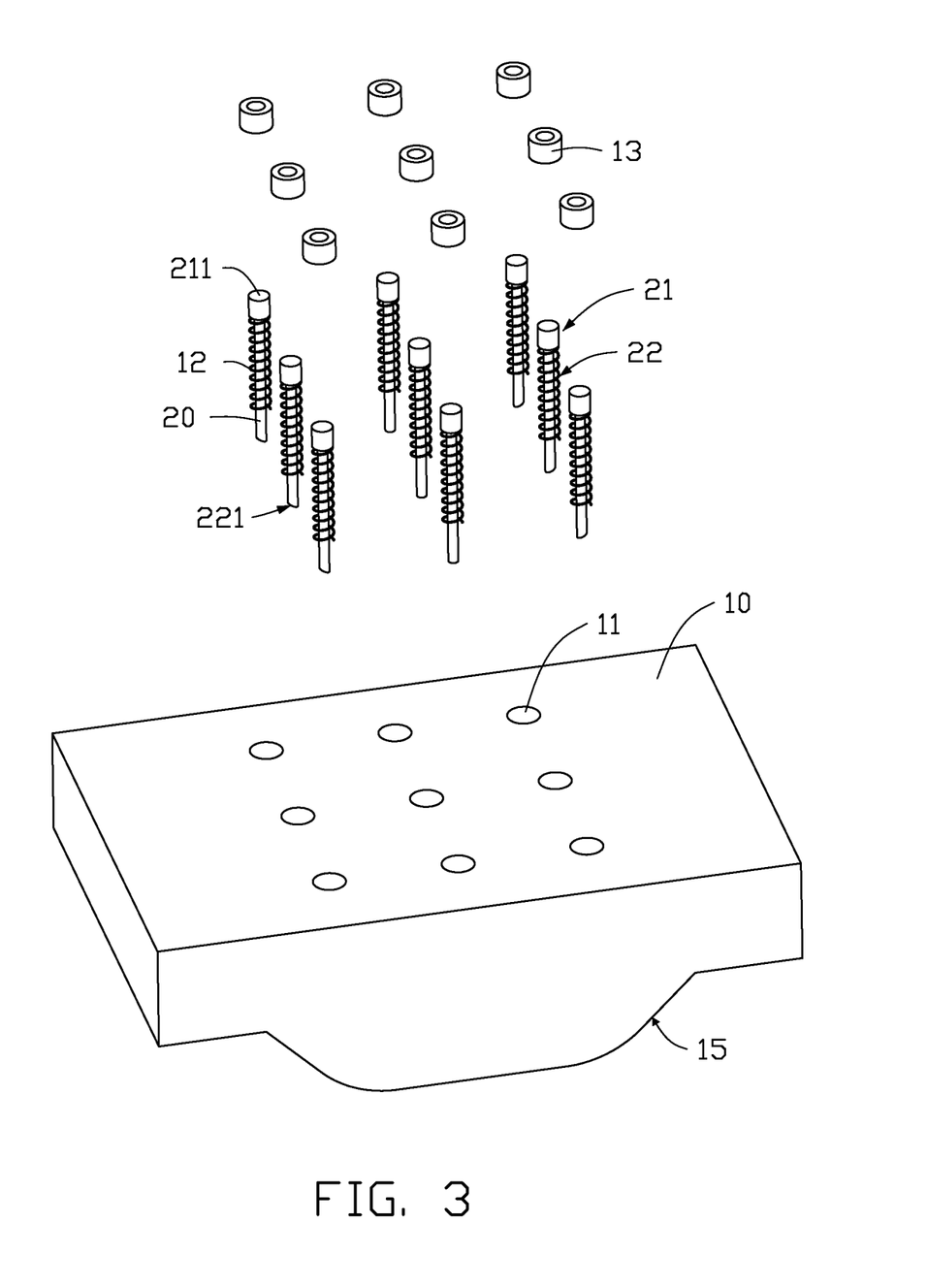
FIG. 3 is an exploded isometric view of the tooling electrode of the gap detection apparatus as shown in FIG. 1.

FIG. 3 illustrates that each of the tool adjusting electrodes 20 can be a substantially T-shaped cylinder, and include a head portion 21 and a pillar portion 22. The head portion 21 can include a upper surface 211, and the pillar portion 22 can include a lower surface 221 opposite to the upper surface 211.

Each of the springs 12 can be coiled around the pillar portion 22 of each of the tool adjusting electrodes 20, and the inner diameter of each of the springs 12 and clamping rings 13 can be less than the diameter of the upper surface 211.

When the tool adjusting electrodes 20 are received in the through-holes 11, each of the clamping rings 13 resists against the upper surface 211 of the each of the tool adjusting electrodes 20. The through-holes 11, the springs 12, the clamping rings 13, and tool adjusting electrodes 20 can cooperatively define a auto-reset mechanism (not labeled). The upper surface 211 of the each of the tool adjusting electrodes 20 can be flush with the processing portion 14 (as shown in FIG. 2) and can cooperatively define a processing portion surface 15.

Figure 4:
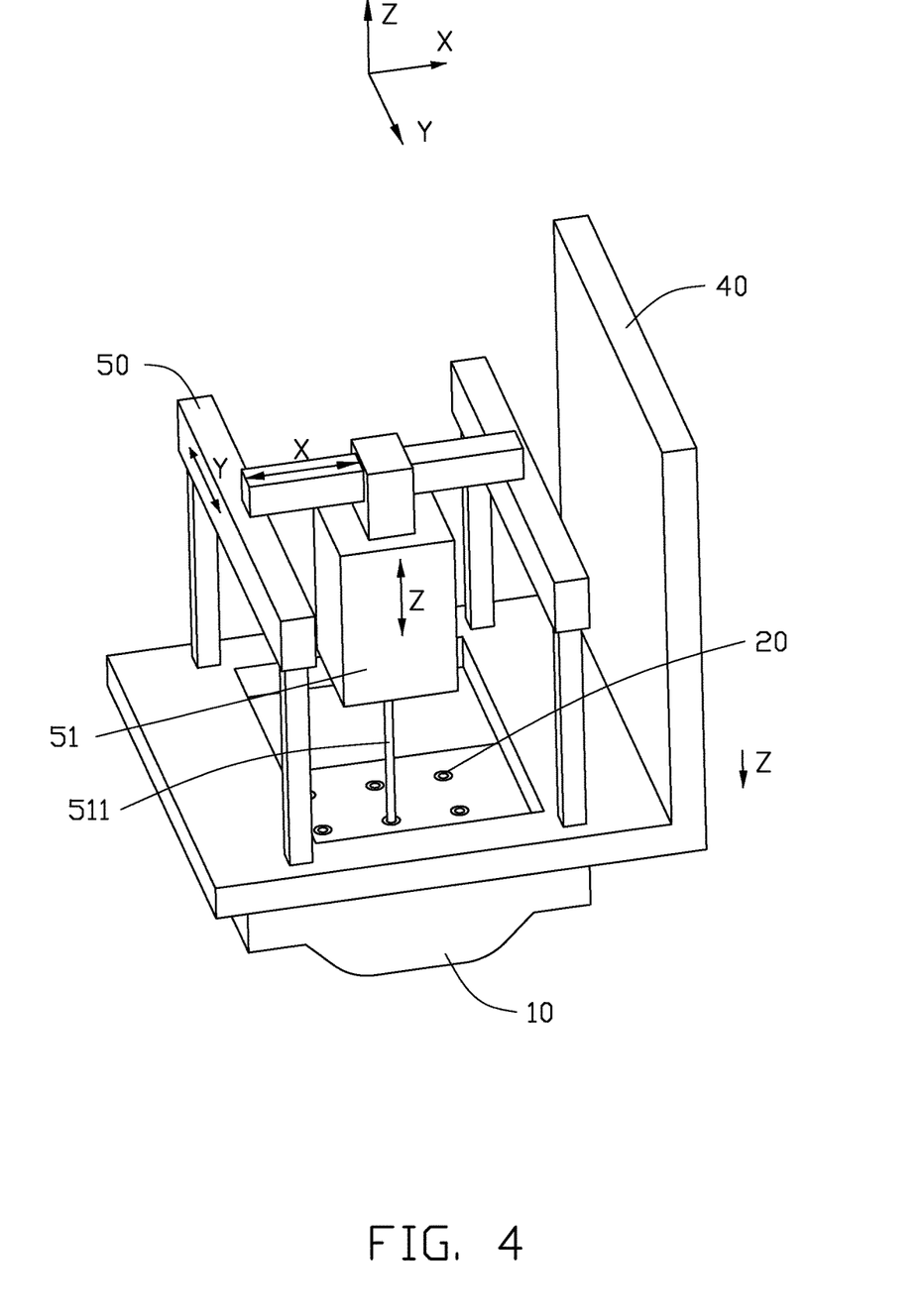
FIG. 4 is a view of the tooling electrode, a processing feed mechanism, and a three-dimensional driving of FIG. 1 assembled together.

FIG. 4 illustrates that the tooling electrode 10 can be positioned on the side of the processing feed mechanism 40, and the 3D driving mechanism 50 can be mounted upon the other side of the processing feed mechanism 40 opposite to the tooling electrode 10. The 3D driving mechanism 50 can include a Z-coordinate feeding portion 51, and a thimble 511 connected with the Z-coordinate feeding portion 51. The diameter of the thimble 511 can be less than the inner diameter of each of the clamping rings 13 (as shown in FIG. 2). The thimble 511 can move along the plane directions of X and Y coordinates, and can face any one of the tool adjusting electrodes 20 by passing through the clamping rings 13 (as shown in FIG. 2). The thimble 511 can touch any one of the tool adjusting electrodes 20, and make any one of the tool adjusting electrodes 20 move down by moving the Z-coordinate feeding portion 51.

Figure 5:
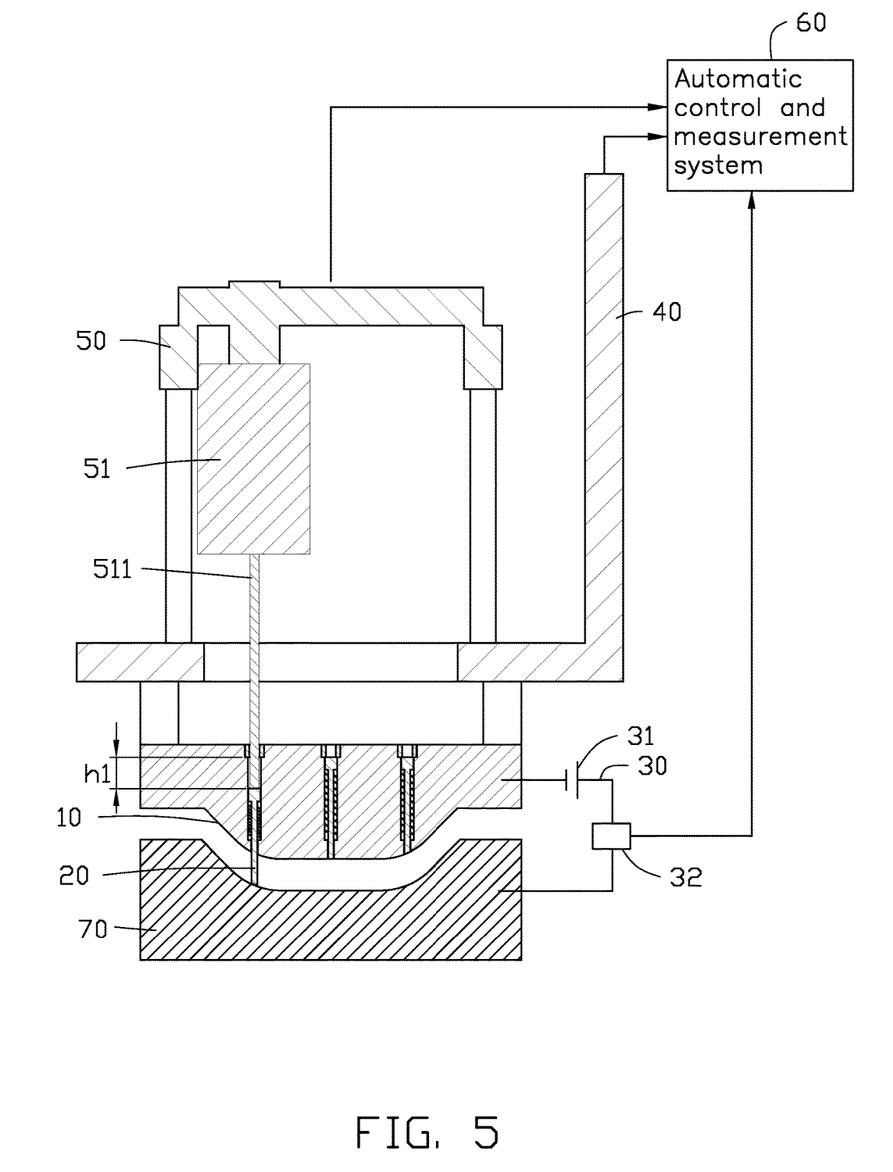
FIG. 5 is a view of the gap detection apparatus of FIG. 1 in the detecting state.
Figure 6:
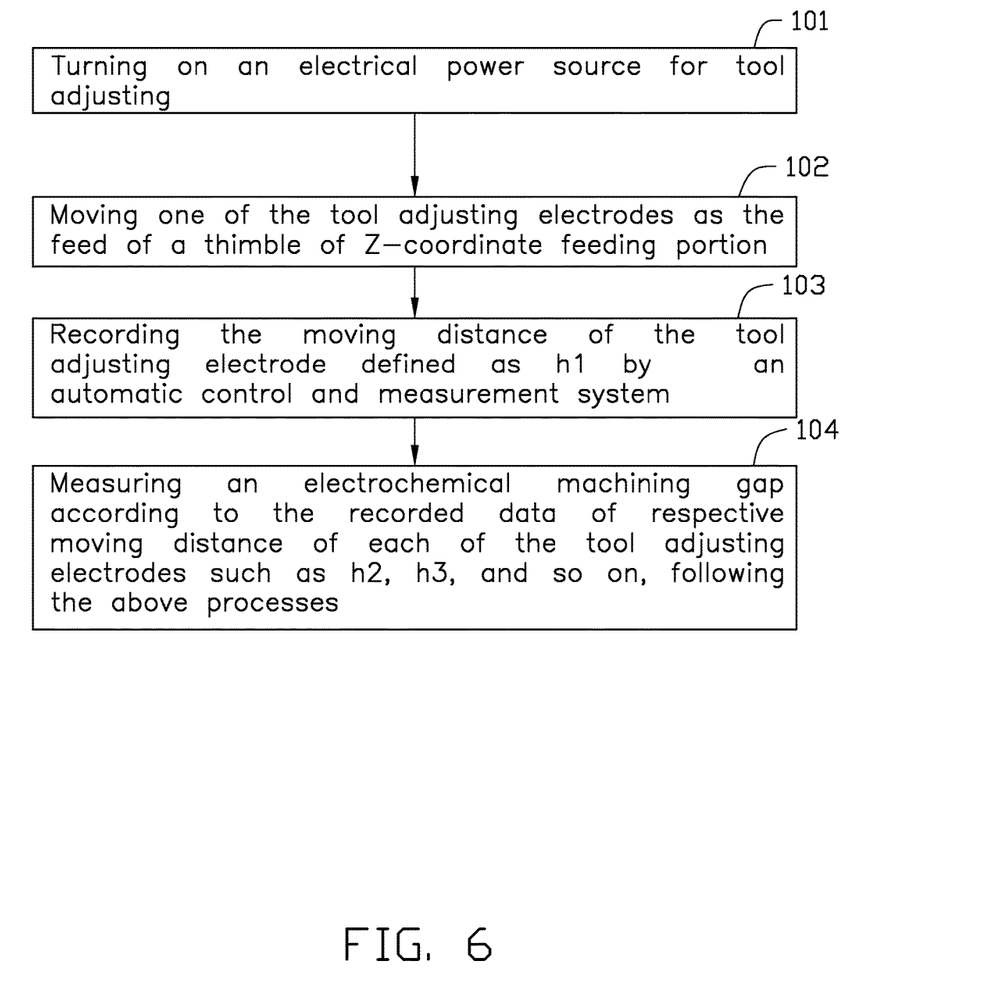
FIG. 6 is a flow diagram of a method for using the gap detection apparatus of FIG. 1.

FIG. 5 illustrates that an example embodiment of an EMC operation. The example application method of detecting the electrochemical machining gap is provided. FIG. 6 illustrates a method for using the gap detection apparatus 100, which can include following.

At block 101, the electrical power source (not shown) of machining and the supply of electrolyte can be cut off in the electrochemical machining process, and the electrical power source 31 for tool adjusting can be turned on.

At block 102, the thimble 511 can face one of the tool adjusting electrodes 20 by controlling the 3D driving mechanism 50. Then the thimble 511 can touch one of the tool adjusting electrodes 20, and the touched tool adjusting electrode 20 can move as the feed of the Z-coordinate feeding portion 51.

At block 103, when the touched tool adjusting electrode 20 touches the workpiece 70, the moving distance of the tool adjusting electrodes 20 can be defined as h1. At this time, the feedback circuit 30 can be short-circuited, and the short-circuited signal can be collected by the sampler 32 and can be fed back to the automatic control and measurement system 60. The automatic control and measurement system 60 can make the Z-coordinate feeding portion 51 stop feeding and return, and can record the h1 as data.

At block 104, the thimble 511 can face other one of the tool adjusting electrodes 20 by moving the 3D driving mechanism 50, and the automatic control and measurement system 60 can record data as to the respective moving distance of each of the tool adjusting electrodes 20 such as h2, h3, and so on, following the above processes. The moving distance of each of the tool adjusting electrodes 20 is equal to the gap between the tooling electrode 30 and the workpiece 70. Therefore, the electrochemical machining gap can be measured according to the recorded data of h1, h2, h3, and so on.

Figure 7:
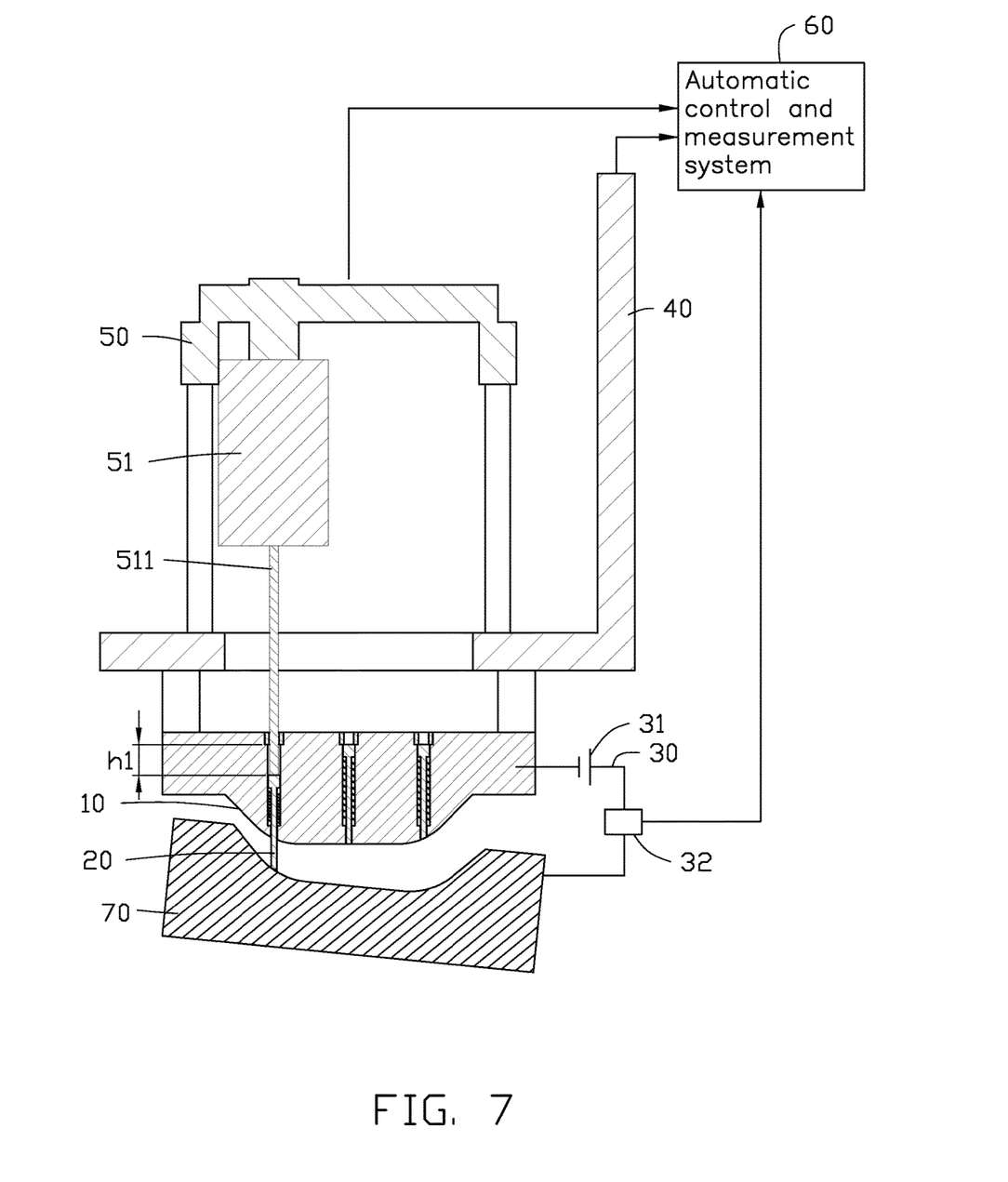
FIG. 7 is a view of the gap detection apparatus of FIG. 1 being adjusted.
Figure 8:
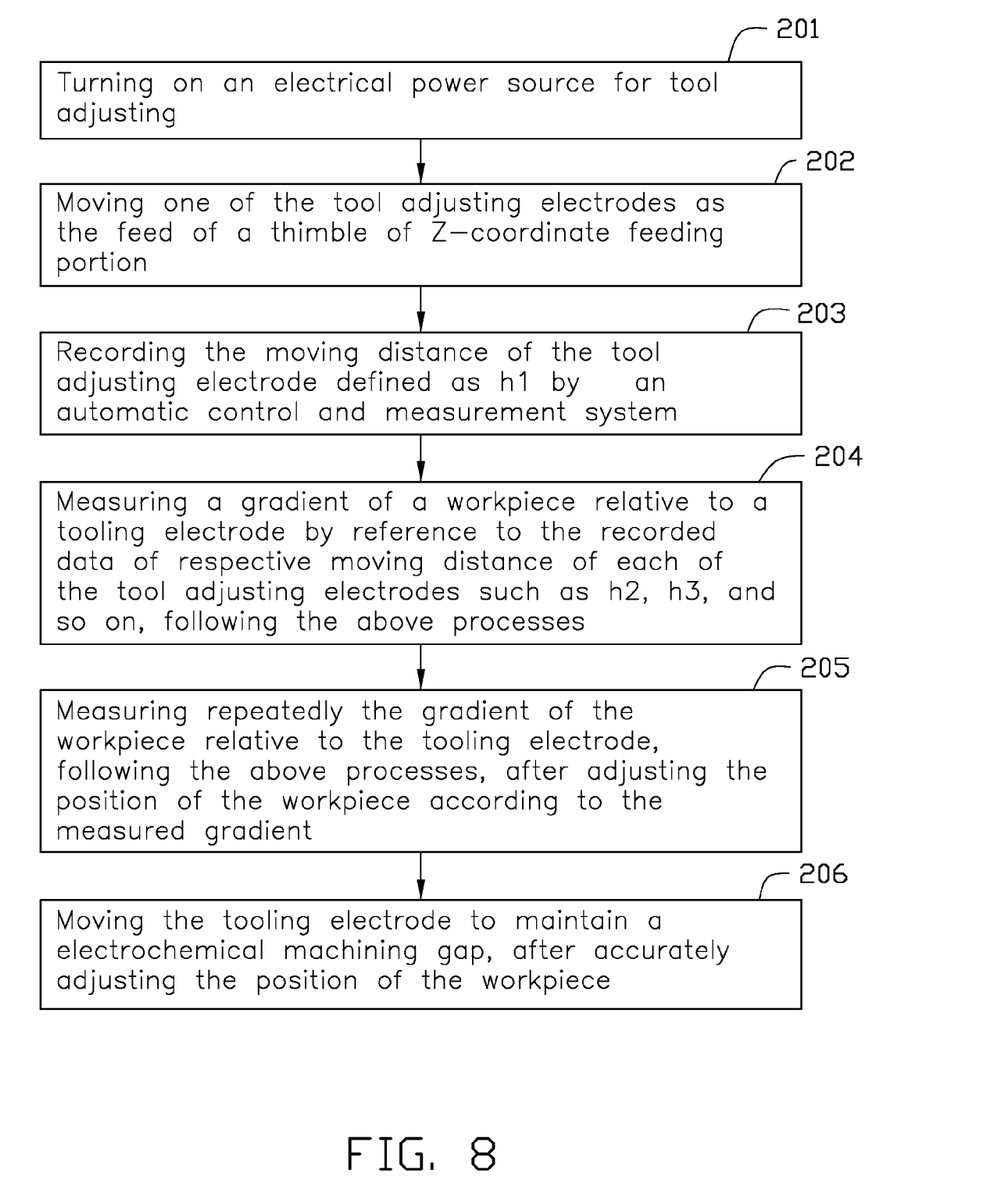
FIG. 8 is a flow diagram of adjusting method for a workpiece by using the gap detection apparatus of FIG. 1.

FIG. 7 illustrates that the position of the workpiece 70 relative to the tooling electrode 10 can be adjusted as follows before the electrochemical machining by the gap detection apparatus 100. FIG. 8 illustrates a adjusting method for the workpiece 70 by using the gap detection apparatus 100, which can include following.

At block 201, before the beginning of adjusting the workpiece 70, the workpiece 70 can be positioned on the fixed fixture (not shown) under the tooling electrode 10, and the electrical power source 31 for tool adjusting can be turned on.

At block 202, the 3D driving mechanism 50 can move under the operation of the automatic control and measurement system 60, the thimble 511 can face one of the tool adjusting electrodes 20 by controlling the 3D driving mechanism 50. Then the thimble 511 can touch one of the tool adjusting electrodes 20, and the touched tool adjusting electrode 20 can move as the feed of the Z-coordinate feeding portion 51.

At block 203, when one of the tool adjusting electrodes 20 touches the workpiece 70, the moving distance one of the tool adjusting electrodes 20 can be defined as h1. At this time, the feedback circuit 30 can be short-circuited, and the short-circuited signal can be collected by the sampler 32 and can be fed back to the automatic control and measurement system 60. The automatic control and measurement system 60 can make the Z-coordinate feeding portion 51 stop feeding and return, and can record the h1 as data.

At block 204, the thimble 511 can face other one of the tool adjusting electrodes 20 by moving the 3D driving mechanism 50, and the automatic control and measurement system 60 can record the data of the moving distances of each of the tool adjusting electrodes 20 such as h2, h3, and so on, following the above processes. The moving distances of each of the tool adjusting electrodes 20 is equal to the gap between the tooling electrode 30 and the workpiece 70. By reference to the recorded data, the automatic control and measurement system 60 can measure a gradient of the workpiece 70 relative to the tooling electrode 10. Therefore, the position of the workpiece 70 can be adjusted according to the measured gradient.

At block 205, after adjusting the position of the workpiece 70, the gradient of the workpiece 70 relative to the tooling electrode 10 can be repeatedly measured, following the above processes, until the gradient of the workpiece 70 relative to the tooling electrode 10 can be within an allowable margin of error.

At block 206, after accurately adjusting the position of the workpiece 70, the Z-coordinate feeding portion 51 can be return to point of origin, and the tooling electrode 10 can be move by the processing feed mechanism 40 to maintain the electrochemical machining gap which is required.

As described above, the plurality of tool adjusting electrodes 20 can be positioned in the through-holes 11 of the tooling electrode 10, and the each of the tool adjusting electrodes 20 can be moves as the thimble 511 moves, by the 3D driving mechanism 50. The electrochemical machining gap can be measured according to the moving distance of each of the tool adjusting electrodes 20. Therefore, the gap detection apparatus 100 can detect the electrochemical machining gap in real time for a workpiece 70 of complex shape, independent of temperature and conductivity of electrolyte, type of the machining electric current, and gas bubbles, and other variables. Furthermore, the position of the workpiece 70 can be accurately adjusting before electrochemical machining.

The embodiments shown and described above are only examples. Many details are often found in the art such as the other features of a gap detection apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A gap detection apparatus comprising:
   a tooling electrode forming a plurality of through-holes;
   a plurality of tool adjusting electrodes configured to be received in the through-holes;
   a processing feed mechanism configured to control the tooling electrode;
   a three-dimensional driving mechanism mounted upon the processing feed mechanism and comprising a Z-coordinate feeding portion and a thimble for feeding of the tool adjusting electrodes; and
   an automatic control and measurement system configured to control the feed of the processing feed mechanism and the three-dimensional driving mechanism and measure an electrochemical machining gap, which is formed between the tooling electrode and a workpiece.

2. The gap detection apparatus as claimed in claim 1, wherein the tooling electrode further comprises a plurality of springs, a plurality of clasping rings, and a processing portion.

3. The gap detection apparatus as claimed in claim 2, wherein each of the tool adjusting electrodes is a substantially T-shaped cylinder, and comprises a head portion and a pillar portion.

4. The gap detection apparatus as claimed in claim 3, wherein the head portion comprises a upper surface, and the pillar portion can include a lower surface opposite to the upper surface;
   the springs are coiled around the pillar portions, and the inner diameter of each of the springs and clamping rings can be less than the diameter of the upper surface.

5. The gap detection apparatus as claimed in claim 2, wherein the tool adjusting electrodes are received in the through-holes by the clamping rings.

6. The gap detection apparatus as claimed in claim 1, wherein each of the through-holes is a stepped hole, and comprises a upper through-hole portion, middle through-hole portion, and a lower through-hole portion.

7. The gap detection apparatus as claimed in claim 6, wherein the diameter of the upper through-hole portion is larger than the diameter of the middle through-hole portion, and the diameter of the middle through-hole portion is larger than the diameter of the lower through-hole portion.

8. The gap detection apparatus as claimed in claim 1, wherein the thimble is connected with the Z-coordinate feeding portion.

9. The gap detection apparatus as claimed in claim 2, wherein the diameter of the thimble can be less than the inner diameter of each of the clamping rings.

10. The gap detection apparatus as claimed in claim 4, wherein the upper surface is flushes with the processing portion cooperatively defining a processing portion surface.

11. The gap detection apparatus as claimed in claim 1, wherein the gap detection apparatus further includes a feedback circuit.

12. The gap detection apparatus as claimed in claim 11, wherein the feedback circuit comprises a electrical power source and a sampler.

13. The gap detection apparatus as claimed in claim 11, wherein the feedback circuit is connected with the processing electrode and the workpiece.

14. The gap detection apparatus as claimed in claim 11, wherein the short circuit voltage of the electrical power source is less than the decomposition voltage of electrochemical machining for the workpiece.

15. The gap detection apparatus as claimed in claim 1, wherein the three-dimensional driving mechanism faces the tooling electrodes.

* * * * *